Patented Mar. 14, 1944

2,344,288

UNITED STATES PATENT OFFICE 2,344,288

METHOD FOR SOLUBILIZING TITANIFEROUS ORES

Roy Dahlstrom, Metuchen, N. J., assignor to National Lead Company, New York, N. Y., a corporation of New Jersey No Drawing. Application February 12, 1942, Serial No. 430,634

7 Claims. (Cl. 23—117)

The present invention relates to processes for the manufacture of titanium dioxide pigments. It has especial reference to such processes which include a "digestion" step wherein a titaniferous ore, e. g., ilmenite, is reacted with strong sulfuric acid.

In the prevalent methods for manufacturing titanium dioxide pigments, a titaniferous ore, generally ilmenite, is caused to react in a suitable chamber with strong sulfuric acid, whereby there is obtained a digestion mass, or cake, consisting largely of water-soluble sulfates of titanium and iron. This digestion cake is then dissolved in aqueous media to bring into solution the iron and titanium. Since the starting material, i. e., titaniferous ore, always contains impurities, among them siliceous matter, which is not attacked by the sulfuric acid, the solution obtained from the digestion cake always contains undissolved residues. These residues consist not only of the siliceous material but also of particles of unattacked ore. In present practice they are settled out of the solution and separated therefrom, for instance, by decantation and filtration. It will be seen that the residues contain valuable titanium constituents which, if the residues are discarded, constitute an economic loss. The present invention constitutes a simple means for re-circulating the undissolved residues separated from the solution of the digestion cake.

It is an object of the present invention to effect improved recovery of the titanium values of a titaniferous ore in the manufacture of titanium pigments. It is the further object of the present invention to prevent "build up" of insoluble material, usually accompanying recirculation of digestion residues. An important further object of the present invention is to hasten the settling of insoluble digestion residues suspended in the solution obtained from the dissolution of the digestion cake. It is the further object of the invention to eliminate or at least reduce the amount of ferric iron in the solution obtained from the dissolution of the digestion cake. These and other objects of the invention will become apparent from this description.

According to the invention, in its broadest aspect, the insoluble residue obtained from a solution of digestion cake is subjected to a heat-treatment and thereafter mixed with titaniferous ore. The mixture so obtained is then, pursuant to the invention, reacted with strong sulfuric acid in the usual way.

In the practice of the invention natural titaniferous ore, e. g., ilmenite, is reacted with strong sulfuric acid in the known manner and the resultant cake dissolved according to standard practice in aqueous media. The resultant solution is then clarified according to the methods known in the art which usually include the addition to the solution of some clarifying agent which promotes the settling of the undissolved residue. When, in the clarification step, the residues have settled they are separated from the clarified liquor in any convenient manner, as by decantation and/or filtration. Preferably, they should be washed and the wash liquors added to the solution. After washing the residues may be dried. They are now ready for the heat treatment, in accordance with the present invention.

The heat treatment may be carried out under varying conditions; that is to say, under reducing condition, neutral or oxidizing conditions and at temperatures within a wide range, for instance, from about 200° C. to about 1300° C. Regardless of conditions and temperature of the heat treatment, it has been found that when using heat-treated digestion residues admixed with titaniferous ores the settling of the insoluble residues suspended in the digestion solution is very much improved. When the heat-treatment is carried out under reducing conditions two added advantages are attained: (a) an improved recovery of the titanium values contained in the digestion cake; and (b) a saving of metallic iron employed in the reduction treatment of the digestion solution to effect the reduction of ferric iron contained in the residue to ferrous state. When the heat-treatment is carried out under oxidizing conditions no advantages over those attained through a neutral heat-treatment are observable. In fact an oxidizing heat-treatment tends to lower somewhat the recovery of the titanium values of the digestion cake and to necessitate the use of an increased amount of metallic iron in the reduction of the digestion solution.

When it is desired to carry out the heat-treatment under reducing conditions this may be done in a number of convenient ways. For instance, the residue may be mixed with a carbonaceous reducing agent, e. g., carbon, coal, saw-dust, fuel oil, and the like, after which the mixture is heated. Alternatively the residue may be subjected to a reducing heat-treatment either in the presence of a reducing gas, for instance, hydrogen, illuminating gas, etc. Under reducing conditions, the duration and temperature of the heat-treatment will largely depend upon the degree of reduction of the iron content of the residue desired. If it be desired to reduce the iron to metallic state then, generally speaking, a high temperature, in the neighborhood of 1100° C. and above is preferred; whereas, if only a reduction to the ferrous state is desired then lower temperatures, in the order of about 800° C. may be employed. Generally, a period of heating of between about one hour and four hours will suffice.

For a neutral heat-treatment where neither oxidation nor reduction occurs, temperatures as low as 200° C. may be employed if desired to effect only a dehydration of the residues.

After the heat-treatment which, according to the invention, may be in the nature of a reducing treatment, a high temperature neutral heating, or a dehydration, the residue is mixed with fresh titaniferous ore. The proportions of the mixture are not important but for convenience of operation the proportion of ore to acid should be between about 5 to 20 parts ore to 1 part of heated residue; 10 parts ore to 1 part residue gives very satisfactory results. The mixture of ore and residue is then digested with strong sulfuric acid in the usual manner and the resultant cake dissolved in aqueous media. It will be found that when using the heated residue clarification proceeds faster and more efficiently as compared with the prior art. The following example will more specifically illustrated the invention, it being understood that it is in no way restrictive as to proportions, temperatures or other conditions:

Example

A sample of dried digestion residue obtained from filtration of a raw digestion solution was found to have the following analysis:

|  | Per cent |
|---|---|
| $TiO_2$ | 50.9 |
| FeO | 6.20 |
| $Fe_2O_3$ | 3.65 |

This material was heated at temperatures between 1100–1200° C. for 3 hours. After calcination the product was found to contain 1.8% metallic iron; 7.2% FeO, and was free of any ferric iron. The heated residue was then mixed with ilmenite ore in the following proportion:

|  | Grams |
|---|---|
| Ore | 2,050 |
| Residue | 200 |

This mixture was then digested in the following manner: It was thoroughly mixed with 1835 cc. of 99% sulfuric acid. To this mixture was added 420 cc. of water to initiate the reaction. After the digestion reaction the resulting cake was dissolved in water and adjusted to a specific gravity of 1.466 at 36° C.

This solution when subjected to clarification, using glue as a clarification agent, settled more rapidly than a similar digestion in which unheated, wet digestion was employed.

As a basis for comparison a controlled digestion was conducted in the following manner: 2050 grams of ilmenite ore were mixed with 200 grams of unheated, wet digestion residue. This residue was the same as that employed in the example but had not been subjected to a reducing heat treatment according to the invention. It was mixed with sulfuric acid as described in the example, and the digestion carried out in a similar manner. The digestion cake was dissolved in water and the solution adjusted to the specific gravity of 1.465 at 36° C. The clarification of both the solutions from the example and the control digestion was treated with glue in the proportion of 1 part of glue to 1000 parts of solution by weight and allowed to settle over a period of 3 hours. The settling results are given in the following table:

Table

| Time | Digestion with unheated wet residue | Digestion with heated residue |
|---|---|---|
|  | Per cent | Per cent |
| 1 hour | 22.2 | 28.8 |
| 2 hours | 37.6 | 52.7 |
| 3 hours | 59.3 | 70.0 |

In the above table the values of clear liquor are reported.

It can be seen from the above data that in the digestion of residues heat-treated in accordance with the present invention two advantages are at once obvious. First, ferric iron in the residue when reduced to metallic condition reduces the ferric iron in the ore and the solution obtained therefrom will not require as much reducing treatment as in the prior art. Second, the circulation of residues calcined in accordance with the present invention results in better clarification conditions than when uncalcined residues are circulated. Even when merely dehydrating the digestion residue according to the invention, improved settling and increased recovery of titanium values are obtained.

In order to demonstrate the improved recovery of titanium values from the digestion residues the controlled digestion above described was repeated ten times as was also repeated ten times the procedure described under example. The average conversion to soluble titanium compounds in the ten digestions carried out according to the control was 90.4%; the average conversion for the 10 digestions following the procedure of the example was 93.5%.

From the foregoing it will be seen that the present invention contemplates subjecting digestion residues to a reducing calcination, the admixture of such calcined residues with titanium ore and the processing of such ores to obtain solutions of titanium and iron which may be further processed to obtain the valuable titanium constituents, for instance, as titanium dioxide pigments. The intensity of the reducing calcination, i. e., the time and temperature thereof, the use of a carbonaceous reducing agent, a reducing gas, or the other conditions of the calcination may all be varied within wide limits without departing from the scope of the invention. Furthermore, the amount of calcined residues admixed with titaniferous ore may also be varied widely without departing from the scope of the invention.

I claim:

1. Method for preparing sulfuric acid solutions of titaniferous ores which comprises reacting a titaniferous ore with strong sulfuric acid to form water-soluble sulfates, dissolving said sulfates in aqueous media, separating the resultant sulfate solution from the solid residue contained therein, heating said residues separately and as such at temperatures from about 200° C. to about 1300° C., admixing the heated residue with fresh titaniferous ore and reacting the mixture with strong sulfuric acid.

2. Method for preparing sulfuric acid solutions of titaniferous ores which comprises reacting a titaniferous ore with strong sulfuric acid to form water-soluble sulfates, dissolving said sulfates in aqueous media, separating the resultant sulfate solution from the solid residue contained therein, heating the said residues separately and as such at temperatures from about 800° C. to about 1300° C. for between about one hour and about four hours, admixing the heated residue with fresh titaniferous ore and reacting the mixture with strong sulfuric acid.

3. Method for preparing sulfuric acid solutions of titaniferous ores which comprises reacting a titaniferous ore with strong sulfuric acid to form water-soluble sulfates, dissolving said sulfates in aqueous media, separating the resultant sulfate solution from the solid residue contained therein, heating the said residues separately and as such under reducing conditions from about 800° C. to about 1300° C. until the iron contained in the said residue is converted to ferrous condition, admixing the heated residue with fresh titaniferous ore and reacting the mixture with strong sulfuric acid.

4. Method for preparing sulfuric acid solutions of titaniferous ores which comprises reacting a titaniferous ore with strong sulfuric acid to form water-soluble sulfates, dissolving said sulfates in aqueous media, separating the resultant sulfate solution from the solid residue contained therein, heating the said residues separately and as such under reducing conditions from about 800° C. to about 1300° C. until the iron contained in the said residue is converted to metallic condition, admixing the heated residue with fresh titaniferous ore and reacting the mixture with strong sulfuric acid.

5. Method for preparing sulfuric acid solutions of titaniferous ores which comprises reacting a titaniferous ore with strong sulfuric acid to form water-soluble sulfates, dissolving said sulfates in aqueous media, separating the resultant sulfate solution from the solid residue contained therein, separately dehydrating said residues as such, admixing the heated residue with fresh titaniferous ore and reacting the mixture with strong sulfuric acid.

6. Method for preparing sulfuric acid solutions of titaniferous ores which comprises reacting a titaniferous ore with strong sulfuric acid to form water-soluble sulfates, dissolving said sulfates in aqueous media, separating the resultant sulfate solution from the solid residue contained therein, heating said residues separately and as such at temperatures between about 200° C. and about 800° C. until the same are dehydrated, admixing the heated residue with fresh titaniferous ore and reacting the mixture with strong sulfuric acid.

7. Method for preparing sulfuric acid solutions of titaniferous ores which comprises reacting a titaniferous ore with strong sulfuric acid to form water-soluble sulfates, dissolving said sulfates in aqueous media, separating the resultant sulfate solution from the solid residue contained therein, heating said residues separately and as such at temperatures between about 200° C. and about 800° C. for between about one hour and about four hours, admixing the heated residue with fresh titaniferous ore and reacting the mixture with strong sulfuric acid.

ROY DAHLSTROM.